(12) United States Patent
Ben Simon et al.

(10) Patent No.: US 11,139,987 B2
(45) Date of Patent: Oct. 5, 2021

(54) COMPACT SECURITY CERTIFICATE

(71) Applicant: ALTAIR SEMICONDUCTOR LTD., Hod Hasharon (IL)

(72) Inventors: Yehuda Ben Simon, Ramat Hasharon (IL); Omer Botvinik, Herzliya (IL); Avishay Sharaga, Beit Nehemya (IL)

(73) Assignee: SONY SEMICONDUCTOR ISRAEL LTD., Hod Hasharon (IL)

( * ) Notice: Subject to any disclaimer, the term of this patent is extended or adjusted under 35 U.S.C. 154(b) by 273 days.

(21) Appl. No.: 16/261,593

(22) Filed: Jan. 30, 2019

(65) Prior Publication Data
US 2019/0245702 A1    Aug. 8, 2019

Related U.S. Application Data

(60) Provisional application No. 62/626,092, filed on Feb. 4, 2018.

(51) Int. Cl.
| | |
|---|---|
| *H04L 9/32* | (2006.01) |
| *G06F 21/72* | (2013.01) |
| *H04L 9/30* | (2006.01) |
| *G06F 21/44* | (2013.01) |
| *G06F 21/64* | (2013.01) |

(52) U.S. Cl.
CPC ............ *H04L 9/3268* (2013.01); *G06F 21/44* (2013.01); *G06F 21/64* (2013.01); *G06F 21/72* (2013.01); *H04L 9/30* (2013.01); *H04L 9/3247* (2013.01)

(58) Field of Classification Search
CPC ....... H04L 9/3268; H04L 9/30; H04L 9/3247; H04L 2209/12; G06F 21/44; G06F 21/64; G06F 21/72
See application file for complete search history.

(56) References Cited

U.S. PATENT DOCUMENTS

| | | | | |
|---|---|---|---|---|
| 9,479,340 | B1 * | 10/2016 | Miller | ...................... G09C 1/00 |
| 2005/0195975 | A1 * | 9/2005 | Kawakita | .............. H04L 9/0825 380/30 |

OTHER PUBLICATIONS

Waslo et al., "Industry 4.0 and cybersecurity: managing risk in an age of connected production", Deloitte University Press, A Deloitte series on digital manufacturing, pp. 1-24, year 2017.
IOT Security Foundation, "Secure Design: Best Practice Guides", pp. 1-17, Dec. 2018.

* cited by examiner

*Primary Examiner* — Jeffrey C Pwu
*Assistant Examiner* — Mayasa A. Shaawat
(74) *Attorney, Agent, or Firm* — Kligler & Associates

(57) ABSTRACT

An Integrated Circuit (IC) includes an on-chip non-volatile memory (NVM) and an on-chip processor. The on-chip NVM is configured to store a representation of a device-specific part of a security certificate assigned to the IC. The on-chip processor is configured to obtain a common part of the security certificate, to reconstruct the security certificate from the obtained common part and from the representation of the device-specific part stored in the on-chip NVM, and to perform a security operation using the reconstructed security certificate.

18 Claims, 3 Drawing Sheets

COMPACT SECURITY CERTIFICATE

CROSS-REFERENCE TO RELATED APPLICATIONS

This application claims the benefit of U.S. Provisional Patent Application 62/626,092, filed Feb. 4, 2018, whose disclosure is incorporated herein by reference.

FIELD OF THE INVENTION

The present invention relates generally to security of electronic devices, and particularly to compact security certificates.

BACKGROUND OF THE INVENTION

To increase communication and/or computing security, communication and/or computing systems are typically provided with a root of trust (RoT), which is considered trustworthy, and may be used to securely establish/provision credentials and other secrets, as well as secure communication channel. Various Secure Production solutions have been developed to securely install the RoT in devices.

In "Industry 4.0 and cybersecurity," Deloitte University Press, Mar. 21, 2017, Waslo et al. describe techniques used for Managing risks in connected production. An article entitled "Secure Design Best Practice Guide," Release 1.2.1, December 2018, by the IOT Security Foundation, lists guidelines for secure IoT product design.

SUMMARY OF THE INVENTION

An embodiment of the present invention that is described herein provides an Integrated Circuit (IC) including an on-chip non-volatile memory (NVM) and an on-chip processor. The on-chip NVM is configured to store a representation of a device-specific part of a security certificate assigned to the IC. The on-chip processor is configured to obtain a common part of the security certificate, to reconstruct the security certificate from the obtained common part and from the representation of the device-specific part stored in the on-chip NVM, and to perform a security operation on data using the reconstructed security certificate.

In some embodiments, the representation includes a compressed form of the device-specific part of the security certificate, and the on-chip processor is configured to decompress the representation of the device-specific part. In an embodiment, the on-chip processor is configured to verify a signature of the reconstructed certificate.

There is additionally provided, in accordance with an embodiment of the present invention, a certificate-signing server including an interface and a processor. The interface is configured for communicating with an Integrated Circuit (IC). The processor is configured to receive from the IC at least a public key, to create a security certificate for the IC, to partition the security certificate into a device-specific part that is specific to the IC and a common part that is not specific to the IC, and to send to the IC less than the entire security certificate, but at least a representation of the device-specific part.

In a disclosed embodiment, the processor is configured to sign the security certificate, and to send a signature of the security certificate to the IC. In an example embodiment, the processor is configured to receive the public key from the IC, and to sign the certificate using a CA private key. In another embodiment, the processor is configured to produce the representation by compressing the device-specific part.

There is also provided, in accordance with an embodiment of the present invention, a certificate-signing server including an interface and a processor. The interface is configured for communicating with an Integrated Circuit (IC). The processor is configured to generate a pair of public and private keys, to create a security certificate for the IC, to partition the security certificate into a device-specific part that is specific to the IC and a common part that is not specific to the IC, and to send to the IC less than the entire security certificate, but at least a representation of the device-specific part.

In some embodiments, the processor is configured to sign the security certificate, and to send a signature of the security certificate to the IC. In an embodiment, the processor is configured sign the certificate using the private key. In an embodiment, the processor is configured to produce the representation by compressing the device-specific part.

There is further provided, in accordance with an embodiment of the present invention, a method including storing, in an on-chip non-volatile memory (NVM) in an Integrated Circuit (IC), a representation of a device-specific part of a security certificate assigned to the IC. Using an on-chip processor in the IC, a common part of the security certificate is obtained, the security certificate is reconstructed from the obtained common part and from the representation of the device-specific part stored in the on-chip NVM, and a security operation is performed on data using the reconstructed security certificate.

There is also provided, in accordance with an embodiment of the present invention, a method including receiving from an Integrated Circuit (IC) at least a public key. A security certificate is created for the IC. The security certificate is partitioned into a device-specific part that is specific to the IC and a common part that is not specific to the IC. Less than the entire security certificate, but at least a representation of the device-specific part, is sent to the IC.

There is also provided, in accordance with an embodiment of the present invention, a method including generating a pair of public and private keys. A security certificate is created for an integrated circuit (IC). The security certificate is partitioned into a device-specific part that is specific to the IC and a common part that is not specific to the IC. Less than the entire security certificate, but at least a representation of the device-specific part, is sent to the IC.

The present invention will be more fully understood from the following detailed description of the embodiments thereof, taken together with the drawings in which:

DETAILED DESCRIPTION OF EMBODIMENTS

Overview

Figure 1:
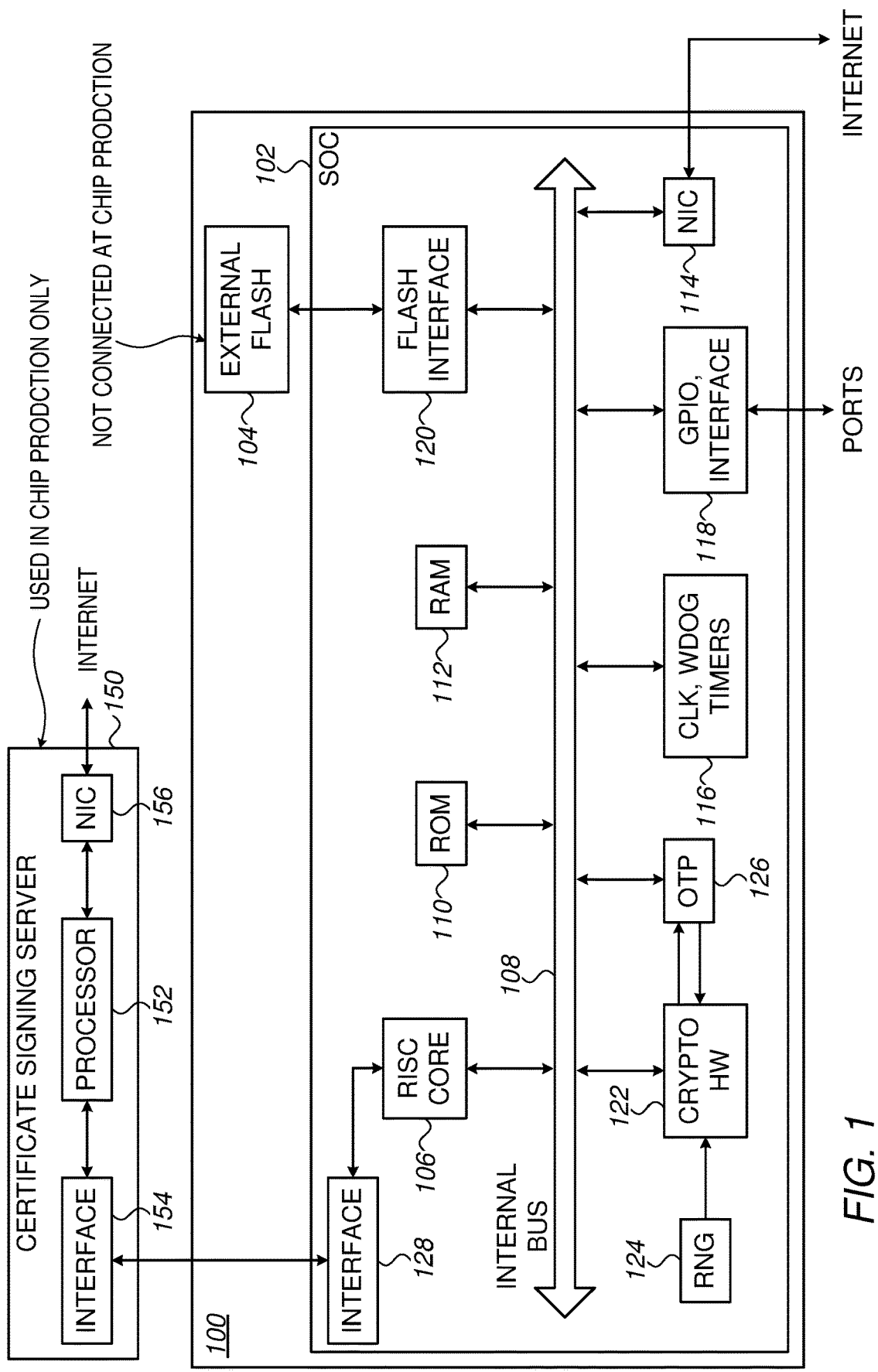
FIG. 1 is a block diagram that schematically illustrates an Internet of Things (IoT) device, in accordance with an embodiment of the present invention.

In computer security, Root of Trust (RoT) is a known trusted entity used for authentication. Typically, the RoT is based on firmware (FW) or on configuration that is stored in on-integrated-circuit non-volatile memory. (For shorter notation, we will refer to "integrated circuit" as "chip" hereinbelow).

The terms RoT and Security Certificate will be used interchangeably in the description hereinbelow. Security Certificate, however, is one example of an RoT. There are typically several types of RoT—for example, RoT for software loading, RoT for attestation, and RoT provisioning. Some RoT types may be certificates, whereas other types are not. Embodiments according to the present invention are not limited to security certificate—alternative embodiments may use any suitable type of RoT.

Installing a first RoT in each computing device is a challenge, as it should typically be done without support of credentials, and yet assure that secrets are not forged, stolen, cloned or otherwise compromised. Secure Production (or Secure Manufacturing) technology, which has been developed by the industry, comprises techniques for installing the initial RoT. Such techniques define the physical and digital security of dedicated production sites that can be used for installing the first secret in devices.

Some applications, however, are not suitable for conventional Secure Production solutions. In the Internet of Things (IoT) market, for example, a huge number of small-volume projects are developed/produced by many vendors at numerous manufacturing sites. This environment introduces new challenges to Secure Manufacturing. A typical IOT device may comprise a Silicon-On-System (SOC) chip, which is manufactured by a chip vendor. At a later Device Production stage, typically in a different site, the SOC and other components are assembled and tested.

One solution that may be suitable for IoT devices is to perform secure production at chip level (rather than at device level), as the number of chip vendors and chip production sites is much smaller than the number of IoT device types.

One challenge of applying the Secure Manufacturing model at chip level is that, in many cases, the chip does not include a sufficient amount of non-volatile memory (NVM) for storing the provisioned RoT.

Embodiments of the present invention provide improved methods and systems for RoT storage at chip-level, given the limited NVM available in typical SOCs. According to embodiments of the present invention, a compact form of the RoT is stored in the SOC's non-volatile memory, which is typically limited in size, during SOC production. The compact form of the RoT comprises a minimal set of SOC-specific information (chip-specific, and thus device-specific information). This minimal set is also referred to herein as a representation of the device-specific part of the certificate. The full RoT is reconstructed in a later phase, e.g., at device production, by providing the common information shared by all devices from the external source, and without the need to provide additional SOC-specific information, from external sources.

In an embodiment, the SOC (or the server) creates a full RoT at chip production, and then strips-off all non-SOC-specific information from the RoT. The SOC then stores the remaining SOC-specific information in on-chip NVM. In some embodiments, the SOC compresses the SOC-specific information, using, for example, ZIP, and then stores the compressed data in the on-chip NVM.

In an embodiment, the non-SOC-specific information (which is the same for all devices) is provided as part of the software image of the IoT device (the integrity of the image is verified by checking its signature). At a later production phase, done at a site that is not required to be secure, the non-SOC-specific information may be stored, for example, in a Flash memory. Software running in the computing device will then reconstruct the RoT from the SOC-specific part that is stored in the on-chip NVM and from the non-SOC-specific part that is stored in the external NVM.

Thus, according to embodiments of the present invention, a compact form of the security certificate can be stored in the available on-chip NVM, without compromising the security of the device. The compact security certificate is created and stored at chip-production, and further manufacturing steps, such as device assembly, do not have to be secure.

System Description

FIG. 1 is a block diagram that schematically illustrates an Internet of Things (IoT) device 100, in accordance with an embodiment of the present invention (IoT devices typically comprise additional units, such as sensors and actuators, which are not shown for the sake of clarity). Generally, the disclosed techniques are applicable in various other types of computing and/or communication devices that require the use of an RoT.

IoT Device 100 comprises an SOC 102 and a Flash Memory chip 104. To create a security certificate, SOC 102 is coupled, at the SOC production site, to a Certificate-Signing Server 150 (Flash 104 is typically not connected at this stage).

SOC 102 comprises, according to the example embodiment of FIG. 1, a Reduced Instruction Set Computer (RISC) Core 106 that executes software programs (in alternative embodiments, other forms of hardware may be used; for example, a Complex-Instruction-Set Computer (CISC)). The RISC core communicates, through an Internal Bus 108, with various units, including: A Read Only Memory (ROM) 110, which is configured to store fixed data (e.g. code and fixed tables); a Random Access Memory (RAM) 112, which is configured to temporarily store data; a Network Interface Controller (NIC) 114, which is configured to interface with the Internet; a Clock/Watchdog/Timer unit 116, which comprises a clock source and timers, including, for example, a watch-dog timer; a General-Purpose-Input-Output (GPIO)/ Interface 118, which is configured to control GPIO ports of the SOC; and, a Flash Interface 120, which is configured to control data transfer between SOC 102 and External-Flash 104.

According to the example embodiment of FIG. 1, to facilitate a compact RoT, SOC 102 further comprises a Crypto-Hardware 122, a Random-Number-Generator (RNG) 124, a One-Time-Programming (OTP) memory 126, and an interface unit 128. The Crypto-Hardware is configured to generate pairs of private and public keys (using random numbers generated by RNG 124), and to verify certificate signatures (in some embodiments, certificate signatures may be verified by software). The interface is configured to interface between Core 106 and certificate-signing server 150. In some embodiments, the certificate signing server may be connected to the SOC through the FLAH Interface 120, and in other embodiments through GPIO ports, through the NIC, or through other means.

Certificate-Signing server 150, which is used to generate and sign the certificate at the SOC production site, comprises a processor 152, an interface 154, which is configured to communicate between the certificate-signing server and the SOC, and a NIC 156, which is configured to interface between the certificate-signing server and the internet and, in particular with a certificate-signing authority (in some alternative embodiments, certificate-signing server 150 is a sub-certificate-authority and does not need to connect to a certificate signing authority. In this case, the certificate signing server may not comprise a NIC).

During SOC production, which is done in a secure production facility, the Crypto-Hardware generates a pair of public-private keys and sends the public key and other SOC-specific information to the server (in alternative embodiments, the keys may be generated by the server). The server may then create a security certificate, comprising the SOC-specific part and a common part, the latter of which is typically the same for all devices. The server then signs the certificate using the private key of the Certification Authority or Sub-Certification Authority that is used for the signing process, and sends the SOC-specific part of the security certificate along with the signature back to the SOC. The SOC stores the private key and the SOC-specific part of the security certificate (or a representation thereof), in OTP 126. In some embodiments, the SOC compresses the data that the SOC stores in the OTP. The common (non-SOC-specific) part of the certificate is provided as a software image, to be used in further production stages (and, in some embodiments, when the SOC system is deployed).

(Certificates are typically built in hierarchies, wherein each certificate comprises a public key, and is signed using a higher hierarchy certificate private key. The device sends the device certificate public key and the server creates a certificate comprising this public key, and signs it with the higher level (CA certificate) private key that resides in the server.)

In subsequent device-level production stages, which are not necessarily secure, the SOC may reconstruct the security certificate, by assembling the common part and the SOC-specific part. The SOC may read the common part of the certificate, for example, from Flash 104, and the SOC-specific part from OTP 126.

In some embodiments, the complete certificate may be stored in an external NVM memory, to be used by the deployed product; in alternative embodiments, the complete certificate is not stored; rather, it is reconstructed by the deployed product whenever needed. The reconstructed certificate may be used by the IoT device for performing any desired security-related operation, such as secure communication and secure software update.

Thus, according to the example embodiment illustrated in FIG. 1, high level certificate-based security is provided, without the need for large on-chip NVM memory and without the need for a secure device production site. Certificate is validated by a third party (e.g., a server) by verifying the signature of the entire certificate (chip specific and generic).

Since the signature is stored in OTP and the reconstructed certificate is identical to the initial certificate used to calculate the signature, the signature can be validated.

The same device software that reconstructs the certificate can verify its correctness by validating the signature after reconstruction.

As would be appreciated, IoT computing device 100, SOC 102 and certificate-signing server 150 are described by way of example. IoT devices, other types of computing devices, SOCs and servers in accordance with the disclosed techniques are not limited to the description hereinabove. For example, in alternative embodiments, RISC 106 may be replaced by a Complex Instruction Set Computer (CISC), or by an aggregation of multiple computers; clock/watchdog/timer unit 106 and GPIO/Interface unit 118 may be missing or replaced by similar units. In some embodiments there is no ROM, and in other embodiments FLASH 104 may be replaced by other storage media. In some alternative embodiments, the Certificate-signing server is connected to SOC 150 through parallel interface (rather than through serial interface 128), through the NIC ports, or, for example, through scan-chain of the SOC pads.

Example—an X.509 Certificate

In various embodiments, the disclosed techniques can be used with various types and formats of security certificates. The following example lists the fields of a security certificate conforming to ITU X.509 V3 standard, and the SOC-specific fields thereof:

Certificate
    Version Number
    Serial Number
    Signature Algorithm ID
    Issuer Name
    Validity period
        Not Before
        Not After
    Subject name
    Subject Public Key Info
        Public Key Algorithm
        Subject Public Key
    Issuer Unique Identifier (optional)
    Subject Unique Identifier (optional)
    Extensions (optional)
    . . .
Certificate Signature Algorithm
Certificate Signature In the example above, the SOC-specific (device-specific) part of the certificate comprises only the Serial Number, Subject Public Key and the Certificate Signature fields. All other fields are regarded as the common part of the certificate. In this example, extracting the device-specific part of the certificate comprises selecting the Subject Public Key and the Certificate Signature fields.

In alternative embodiments, depending on the format of the certificate, the certificate may be partitioned into a design-specific part and a common part in any other suitable manner.

Figure 2:
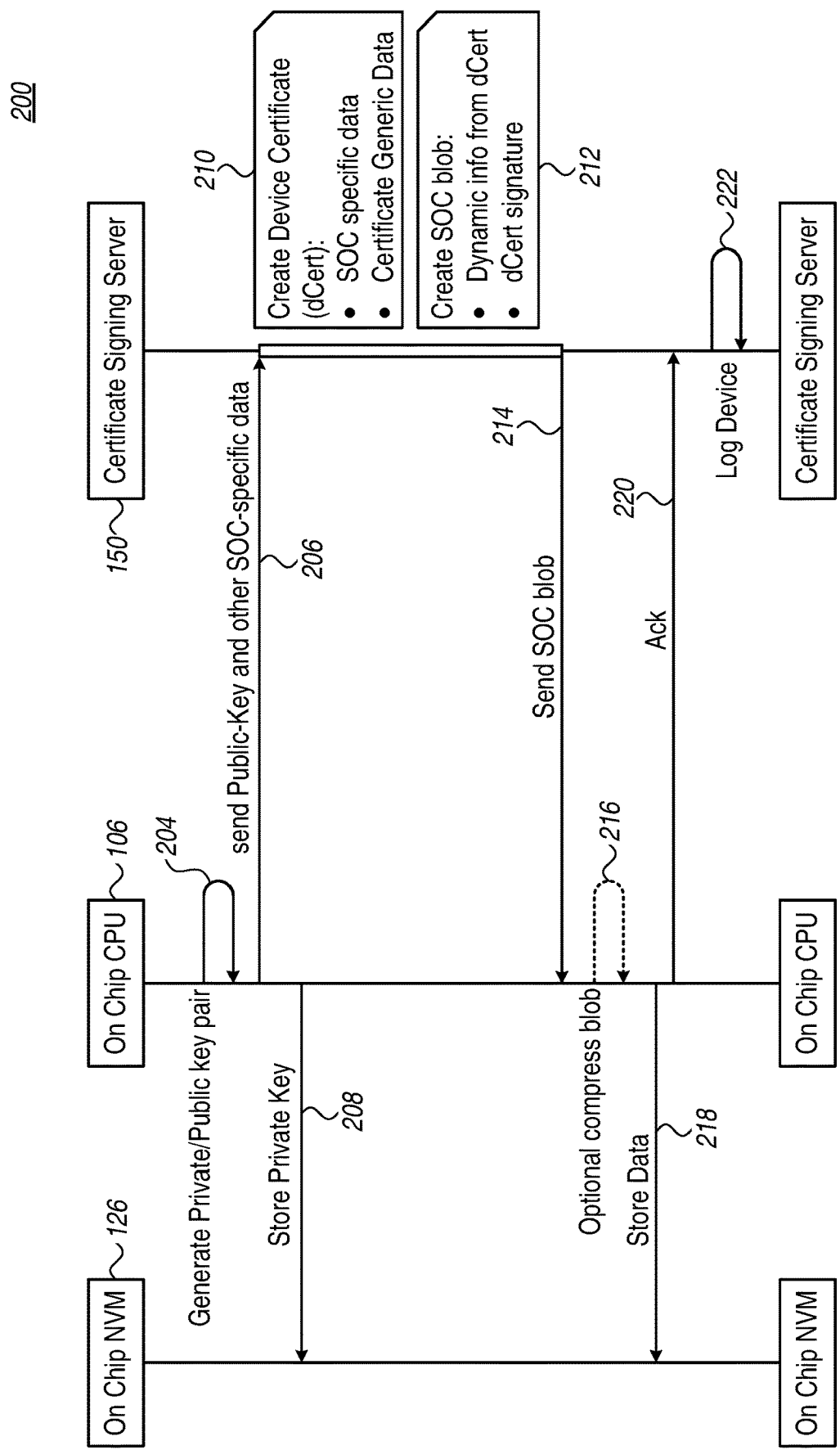
FIG. 2 is a sequence diagram that schematically illustrates a sequence for generating a compact security certificate, in accordance with an embodiment of the present invention.

FIG. 2 is a sequence diagram 200 that schematically illustrates a sequence for generating a compact security certificate, in accordance with embodiments of the present invention. The sequence diagram illustrates operations involving on-chip NVM OTP 126, On-Chip RISC 106, and a Certificate-Signing Server 150 (FIG. 1), located in the chip production site, which is configured to personalize the SOCs.

The sequence starts with a Generating Keys step 204, wherein the On-Chip CPU generates a pair of public and private keys. At a Sending SOC Info step 206, the SOC sends the public key and other SOC-specific data to Certificate-Signing Server 150, and at a Storing Private Key step 208, the CPU stores the private key in the OTP.

After receiving the SOC-specific data from the SOC, Certificate-Signing Server 150 executes a Creating SOC Certificate step 210. The certificate comprises SOC specific data and certificate specific data that is managed by the server. Next, in a Creating SOC Blob step 212, the server signs the certificate, and creates a Binary-Long-Object (Blob) string, comprising the certificate specific information and the certificate signature. The server will then, at a Sending SOC Blob step 214, send the SOC blob to CPU 106.

After receiving the SOC Blob, CPU 106 may execute a Compressing Blob step 216, wherein the blob is compressed, using, for example, ZIP (it should be noted that step 216 is optional, and, according to some embodiments of the present invention, the blob is not compressed). At a Storing-Blob step 218, the CPU stores the blob (either compressed or non-compressed) in OTP 126, and, at a Sending-Ack step 220, the CPU send an acknowledgement to the Server, indicating that the CPU successfully completed the sequence, and stored the compact security certificate in the OTP. The server, in a Logging Device step 222, logs the sequence information, typically in a manufacturing log file (the log typically comprises a list of all devices and their certificates).

In summary, according to the example embodiment illustrated in FIG. 2, during chip production, the on-chip CPU creates public and private keys; a server in the production facility creates and signs a security certificate; the CPU stores the private key and the specific part of the certificate in the on-chip OTP. The stored data is small relative to a full certificate, and typically fits in the on-chip OTP; in some embodiments the data to be stored is compressed, to further reduce the storage size.

Figure 3:
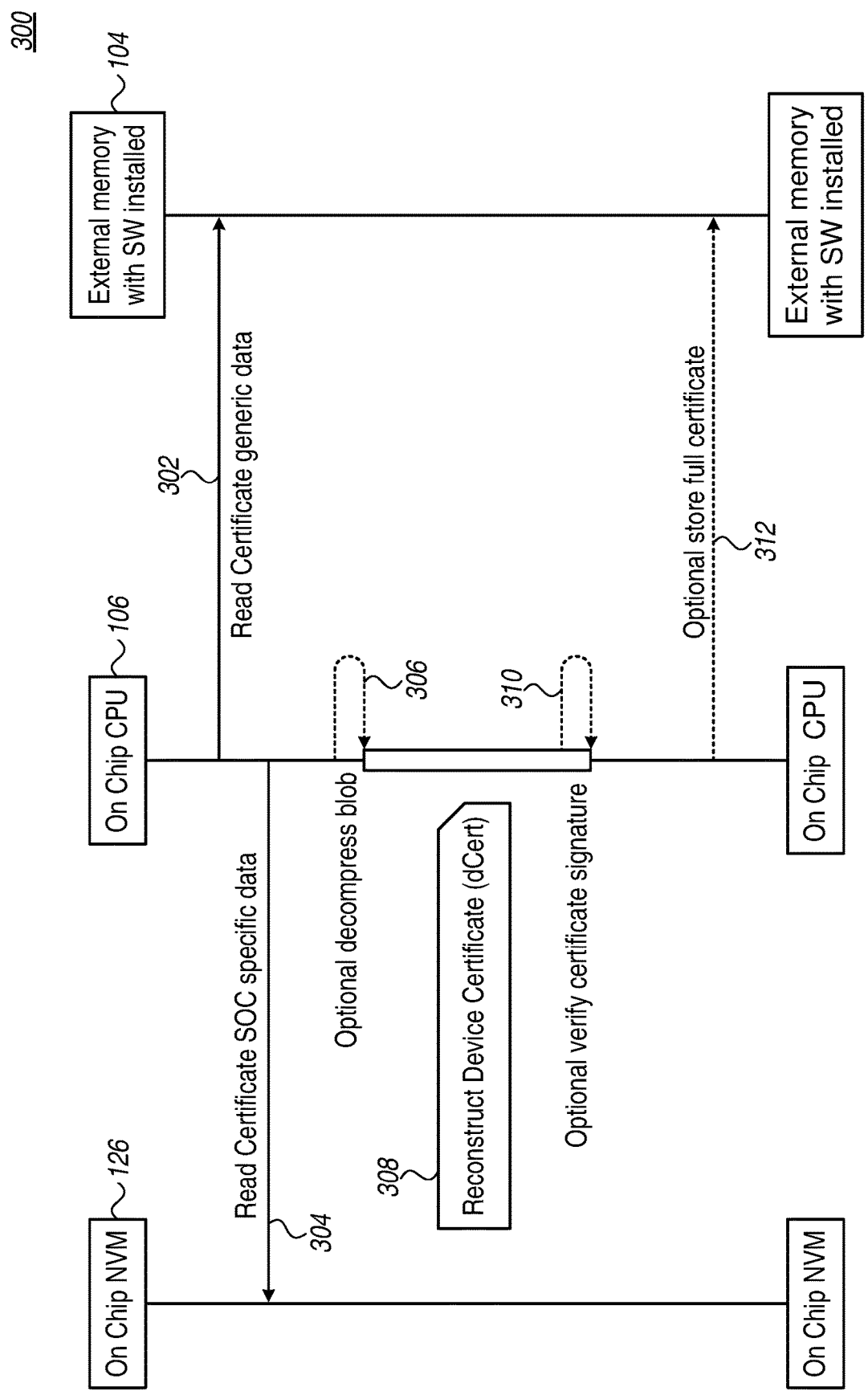
FIG. 3 is a sequence diagram that schematically illustrates a sequence for reconstructing the security certificate, in accordance with an embodiment of the present invention.

FIG. 3 is a sequence diagram 300 that schematically illustrates a sequence for reconstructing the security certificate, in accordance with embodiments of the present invention. The sequence diagram illustrates operations involving on-chip NVM OTP 126, On-Chip RISC 106 (referred to as On-Chip-CPU), and External Flash 104 ("External Memory with Software Installed" in FIG. 3).

The sequence starts at a Reading Certificate Generic Data step 302, wherein on-chip CPU 106 reads a block comprising the certificate generic data from External Flash 104. Next, in a Reading SOC-specific Data step 304, the CPU reads the SOC-specific data from OTP 126. The CPU may optionally enter a Decompressing Step 306, and decompress the SOC-specific data. Next, in a Reconstructing Certificate step 308, the CPU assembles the full certificate from the device specific data and from the certificate generic data. In some embodiments, Step 308 comprises a Verifying Signature step 310, wherein the CPU verifies the certificate's signature.

The CPU is now able securely attest and communicate with external devices. In some embodiments, the CPU now executes an optional Storing Full Certificate step 312, wherein the CPU stores the full security certificate in Flash Memory 104. In alternative embodiments, the CPU never executes step 312, and reconstructs the full certificate whenever the deployed device needs the certificate, by repeating the sequence described hereinabove.

Thus, according to the example embodiment described in FIG. 3, the SOC can securely reconstruct the full security certificate, from limited SOC-specific data that is stored in SOC's OTP, and from unprotected data that is stored externally.

As would be appreciated, sequences 200 and 300, described with reference to FIGS. 2 and 3, are cited by way of example. Sequences in accordance with the disclosed techniques are not limited to the description hereinabove. For example, in alternative embodiments, the CPU may store the seed of the private key rather than the private key in step 208, and reconstruct the private key from the seed in step 304. For another example, the optional compression of the SOC-specific data (step 216) may be done by Certificate-Signing Sever 202 (and, in this case, the blob that the server sends in step 214 will comprise compressed data). In an embodiment, Generating Public/Private key pair step 204 is done by the certificate singing server, which then sends the private key (in addition to other SoC specific information), to the SOC.

The configurations of IoT device 100, SOC 102, certificate-signing server 150, and sequences 200 and 300, illustrated in FIGS. 1-3 and described hereinabove, are example configurations and sequences that are depicted purely for the sake of conceptual clarity. In alternative embodiments, any other suitable configuration can be used. Elements that are not mandatory for understanding of the disclosed techniques have been omitted from the figures for the sake of clarity.

In various embodiments, the different elements of SOC 102 and/or Certificate-Signing Server 150 may be implemented using suitable hardware, such as in an Application-Specific Integrated Circuit (ASIC) or Field-Programmable Gate Array (FPGA). Alternatively, some elements of SOC 102 and/or Certificate-Signing Server 150 may be implemented in software, or using a combination of software and hardware elements.

In some embodiments, SOC 102 and/or certificate signing server 150 comprise one or more general-purpose processors (e.g., RISC core 106), which are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory.

Although the embodiments described herein mainly address compact security certificates in IoT device (and other computing device) applications, the methods and systems described herein can also be used in other types of limited-memory secure devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
   an on-chip non-volatile memory (NVM), configured to store a representation of a device-specific part of an entire security certificate assigned to the IC, together with a signature computed over the entire security certificate, wherein the entire security certificate consists of the device-specific part and a common part that is not stored in the on-chip NVM; and
   an on-chip processor, configured to obtain the common part of the security certificate, to reconstruct the security certificate from the obtained common part and from the representation of the device-specific part stored in the on-chip NVM, and to perform a security operation on data using the reconstructed security certificate.

2. The IC according to claim 1, wherein the representation comprises a compressed form of the device-specific part of the security certificate, and wherein the on-chip processor is configured to decompress the representation of the device-specific part.

3. The IC according to claim 1, wherein the on-chip processor is configured to verify the reconstructed security certificate using the signature stored in the on-chip NVM.

4. A certificate-signing server, comprising:
an interface for communicating with an Integrated Circuit (IC) having an on-chip non-volatile memory (NVM); and
a processor, configured to receive from the IC at least a public key, to create an entire security certificate for the IC, to partition the entire security certificate into a device-specific part that is specific to the IC and a common part that is not specific to the IC, to compute a signature over the entire security certificate, and to send to the IC less than the entire security certificate, but at least a representation of the device-specific part together with the computed signature for storage in the on-chip NVM.

5. The certificate-signing server according to claim 4, wherein the processor is configured to receive the public key from the IC, and to sign the certificate using the public key.

6. The certificate-signing server according to claim 4, wherein the processor is configured to produce the representation by compressing the device-specific part.

7. A certificate-signing server, comprising:
an interface for communicating with an Integrated Circuit (IC) having an on-chip non-volatile memory (NVM); and
a processor, configured to generate a pair of public and private keys, to create an entire security certificate for the IC, to partition the entire security certificate into a device-specific part that is specific to the IC and a common part that is not specific to the IC, to compute a signature over the entire security certificate, and to send to the IC less than the entire security certificate, but at least a representation of the device-specific part together with the computed signature for storage in the on-chip NVM.

8. The certificate-signing server according to claim 7, wherein the processor is configured to sign the certificate using the private key.

9. The certificate-signing server according to claim 7, wherein the processor is configured to produce the representation by compressing the device-specific part.

10. A method, comprising:
storing, in an on-chip non-volatile memory (NVM) in an Integrated Circuit (IC), a representation of a device-specific part of an entire security certificate assigned to the IC, together with a signature computed over the entire security certificate, wherein the entire security certificate consists of the device-specific part and a common part that is not stored in the on-chip NVM; and
using an on-chip processor in the IC, obtaining the common part of the security certificate, reconstructing the security certificate from the obtained common part and from the representation of the device-specific part stored in the on-chip NVM, and performing a security operation using the reconstructed security certificate.

11. The method according to claim 10, wherein the representation comprises a compressed form of the device-specific part of the security certificate, and wherein reconstructing the security certificate comprises decompressing the representation of the device-specific part.

12. The method according to claim 10, and comprising verifying the reconstructed security certificate by the on-chip processor using the signature stored in the on-chip NVM.

13. A method, comprising:
receiving from an Integrated Circuit (IC) at least a public key;
creating an entire security certificate for the IC;
partitioning the entire security certificate into a device-specific part that is specific to the IC and a common part that is not specific to the IC;
computing a signature over the entire security certificate; and
sending to the IC less than the entire security certificate, but at least a representation of the device-specific part together with the computed signature for storage in an on-chip non-volatile memory (NVM).

14. The method according to claim 13, wherein computing the signature comprises signing the certificate using a private key.

15. The method according to claim 13, and comprising producing the representation by compressing the device-specific part.

16. A method, comprising:
generating a pair of public and private keys;
creating an entire security certificate for an integrated circuit (IC);
partitioning the entire security certificate into a device-specific part that is specific to the IC and a common part that is not specific to the IC;
computing a signature over the entire security certificate; and
sending to the IC less than the entire security certificate, but at least a representation of the device-specific part together with the computed signature for storage in an on-chip non-volatile memory (NVM).

17. The method according to claim 16, wherein computing the signature comprises signing the certificate using the private key.

18. The method according to claim 16, and comprising producing the representation by compressing the device-specific part.

* * * * *